United States Patent [19]

Cohn

[11] 4,384,548
[45] May 24, 1983

[54] SAFETY DEVICE FOR AN ANIMAL

[76] Inventor: Kenneth R. Cohn, 2111 Illona La., Merrick, N.Y. 11566

[21] Appl. No.: 269,316

[22] Filed: Jun. 1, 1981

[51] Int. Cl.³ .............................................. A01K 27/00
[52] U.S. Cl. ..................................... 119/109; 119/96; 119/106; 350/98
[58] Field of Search .......................... 119/109, 106, 96; 250/462; 350/98

[56] References Cited

U.S. PATENT DOCUMENTS

| | | | |
|---|---|---|---|
| 2,196,627 | 4/1940 | De Sanctis | 119/109 |
| 2,290,690 | 2/1942 | Lehman | 250/462 |
| 2,939,271 | 6/1960 | Nadel | 250/462 |

Primary Examiner—Jay N. Eskovitz
Attorney, Agent, or Firm—McAulay, Fields, Fisher, Goldstein & Nissen

[57] ABSTRACT

A safety device for an animal which includes retro-reflective threads interwoven to flexible webbing used as a collar and/or leash for the animal to control movement thereof. The retro-reflective threads render the collar and/or leash visible to nighttime by reflecting a large portion of light emitted from a light source directly back to the position of the light source.

20 Claims, 6 Drawing Figures

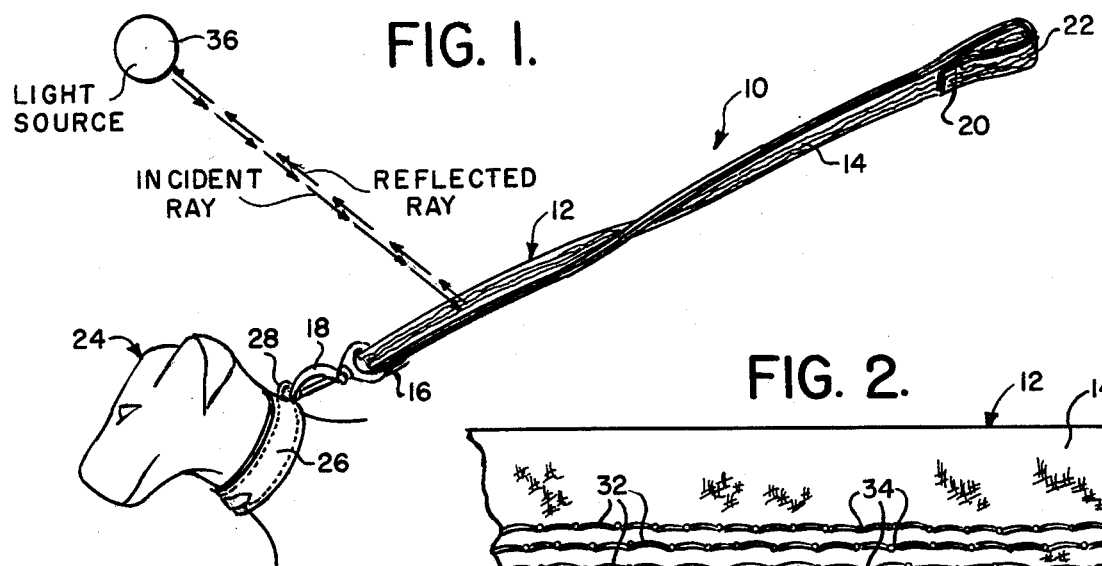
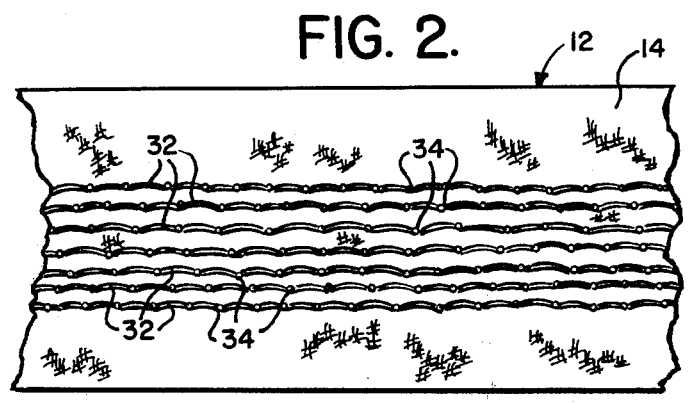
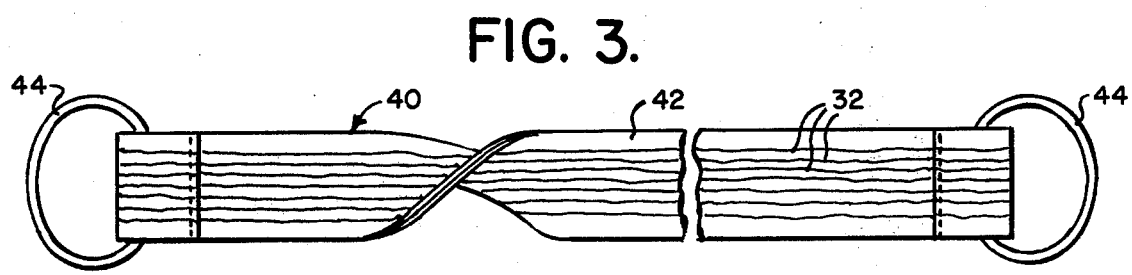
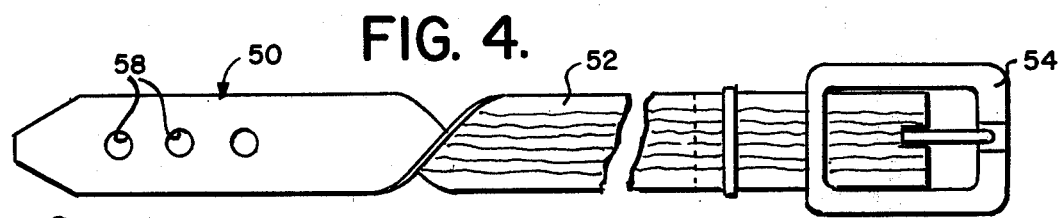
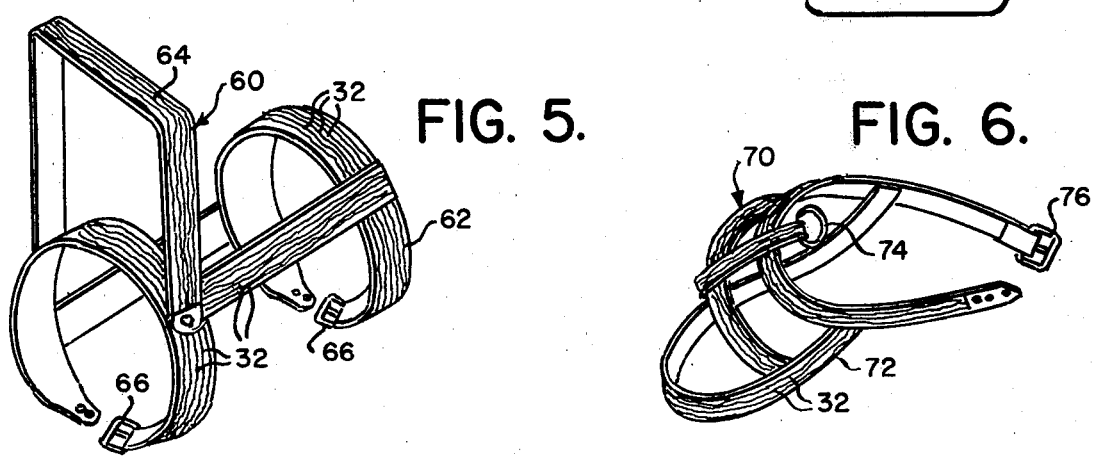
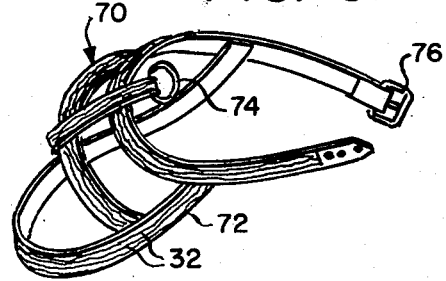

SAFETY DEVICE FOR AN ANIMAL

BACKGROUND OF THE INVENTION

1. Field of the Invention

This invention relates generally to a safety device, and more particularly, to a device having retro-reflective elements associated with an animal to reflect light emitted from a light source directly back substantially along the same path to the position of the light source to improve the illumination of the device and the visibility thereof at nighttime.

2. Description of the Prior Art

Heretofore, it is known to connect light reflecting material to persons and/or objects, such as signs, to render such persons or objects more visible at night when subjected to light from an external source. In such instances, the visibility of the person or object being viewed is determined by the amount and color of light illuminating the person or object and the quantity thereof being reflected from the person or object.

The term "reflection" as used herein means the process by which light bounces off a surface. The three basic types of reflection include diffuse reflection, mirror reflection and retro-reflection. In diffuse reflection, the light strikes a surface which is microscopically rough scattering the light in all directions. Because only a very small amount of light is returned along the path of the incident (incoming) light beam, diffuse reflecting materials have low nighttime visibility.

In mirror reflection, the light strikes a surface which is microscopically smooth reflecting the light from the surface to an equal, but opposite, angle from that of the incident light beam. In mirror reflection, light is returned directly to the source only when the light beam is exactly perpendicular to the surface. Accordingly, mirror-like reflecting materials also are not favored for improving nighttime visibility.

In retro-reflection, the incoming light is returned directly to the source and appears brightest to an observer located near the light source. Because of the ability to return a large portion of the reflected light directly to the source, retro-reflective materials are used extensively for pedestrian safety, traffic signs and hazardous markings.

One form of retro-reflector involves a spherical lens element; such as a glass bead. The incident light beam is refracted (bent) as it passes through the front surface of the bead, is reflected from the back surface thereof, passes back through the bead, again is refracted as it leaves the front surface of the bead and returns along a path directly to the light source. In some applications, the back surface of the bead is coated with a reflective substance. In practice, reflex refractive materials do not direct all light directly back to the source. Rather, the reflected light returns in a cone-shape, with the most intense reflection returning to the center of the light source. However, the cone is very small, with virtually all of the reflected light being within 3° in the incident light ray.

Retro-reflective materials now come in a number of forms for a wide variety of applications. For example, there is reflective fabric for nighttime pedestrian visibility; reflective sheeting for traffic signs, license plates and hazard markings; reflective liquids for spray or brush applications to rough surfaces; and reflective tape and paint for road lane pavement striping.

The above applications have not been entirely satisfactory in the case of animals; and particularly when walking a pet such as a dog at night. For example, there are instances where the use of reflective fabric to be worn either by the animal or the person walking the animal does not provide adequate safeguards; such as in adverse weather conditions requiring over-garments which have the tendency to cover any such retro-reflective fabric. As a result, many persons walking dogs at nighttime still carry a flashlight to signal oncoming traffic of their presence.

Accordingly, an object of the present invention is to provide an improved safety device for the animal by incorporating retro-reflective material directly into an animal control member, such as a combined collar and leash, thereby to improve the visibility thereof at nighttime.

SUMMARY OF THE INVENTION

The present invention provides for the use of thread having glass reflective elements which are interwoven to flexible webbing used as a collar and/or leash for the animal to control movement thereof. The retro-reflective thread renders the collar and/or leash visible at nighttime or dusk by reflecting a large portion of light emitted from the light source directly back to said light source.

The retro-reflective thread may be interwoven either to the top side or bottom side of the webbing, or to each of said sides. A plurality of such retro-reflective threads are preferably interwoven with the webbing and located to extend in an undulating manner along the webbing to reflect light back to the light source directly, but in a non-uniform and undulating pattern, to form a substantially solid image projection when viewed from a position near the light source. The reflective arrangement is such that a composite light beam is formed consisting of certain portions of the incident light beam and the reflected light beam which portions overlap and reinforce the brilliance thereof so that the viewed object is rendered highly visible.

To these ends, the invention consists in the provision of animal control means for association with the animal to control the movement thereof. The animal control means is provided with retro-reflective means which illuminate the control means and render it visible at nighttime to an observer at a light source by reflecting a large portion of light emitted from the light source directly back to the light source.

Additional features and advantages of the present invention will become more apparent from a full consideration of the following detailed description when taken in conjunction with the accompanying drawings.

BRIEF DESCRIPTION OF THE DRAWINGS

FIG. 1 is a perspective view of a safety device for an animal constructed in accordance with the present invention, illustrating the device in the form of two straps of flexible webbing sewn together to form a composite strap unit, and with each side of the strap unit having a plurality of retro-reflective threads interwoven thereto and exposed to a light source, and further illustrating the device used as a leash in association with the animal;

FIG. 2 is an enlarged plan view of a portion of the webbing shown in FIG. 1;

FIG. 3 is a plan view of a single strap of flexible webbing containing the retro-reflective threads constructed in the form of a choke collar for the animal, with each side of the webbing having retro-reflective threads;

FIG. 4 is a view similar to FIG. 3 showing another embodiment of the invention in the form of a buckle collar for the animal, and wherein only the top side of the webbing has retro-reflective threads;

FIG. 5 is a perspective view of another embodiment of the invention illustrating the flexible webbing in the form of a harness for the animal, with only the top side of the webbing having retro-reflective threads; and FIG. 6 is a view similar to FIG. 5 showing another embodiment of the animal harness.

DESCRIPTION OF THE PREFERRED EMBODIMENTS

Referring to the drawing, particularly FIG. 1, numeral 10 represents a safety device for an animal constructed in accordance with the present invention. Safety device 10 includes animal control or restraining means 12 constructed of flexible webbing in the form of a leash 14. One end 16 of leash 14 is connected to a spring-type clip 18 which serves to associate the leash with the animal, while the opposite leash end 20 is folded back on itself and fastened to form handgripping portion 22. For this embodiment, leash 14 is formed of a pair of straps sewn together to form a composite structure. However, leash 14 also could be formed of a single strap of webbing as is the case with the other embodiments of the invention.

The animal is represented by numeral 24 and is shown wearing a conventional collar 26 provided with ring 28. The leash 14 is removably connected to the collar 26 by means of the interconnection of clip 18 with ring 28. Leash 14 may be used to control or restrain movement of animal 24 in conventional manner.

An enlarged view of the flexible webbing used in forming leash 14 is shown in FIG. 2. As is more clearly illustrated, the top and bottom sides of leash 14 each includes retro-reflective means 30 in the form of a plurality of threads 32 interwoven with the webbing in substantially parallel paths. Each thread 32 is formed having a plurality of glass reflective elements or beads 32 extending along the length thereof. The arrangement is such that the retro-reflective threads 32 render the composite leash control member 14 visible from both sides thereof at nighttime to an observer at light source 36 by reflecting a large portion of light emitted from the light source back to said light source such that the pathway for the angle of reflection of the light is substantially the same as the pathway for the angle of incidence. This is illustrated in the substantially identical paths of the incident ray and reflected ray in FIG. 1.

As noted in FIGS. 1 and 2, the plurality of retro-reflective threads 32, in a preferred embodiment of the invention, extend in an undulating manner along the flexible webbing of leash 14 to reflect the light back to light source 36 directly, but in a non-uniform and undulating pattern, to form an image projection comprising a substantially uniform pattern of light reflected from the beads on the threads.

In FIG. 3, the animal control means is represented by numeral 40 which shows a single strap of flexible webbing constructed in the form of a choke collar 42 for the animal, which collar is provided with loop rings 44 at each end for use with a leash in conventional manner. As shown in the drawing, the retro-reflective threads 32 are interwoven to each of the top side and bottom side of the webbing so as to be rendered visible from both sides thereof at nighttime.

FIG. 4 is similar to that of FIG. 3 in that the animal control means 50 is in the form of an identification collar 52. However, for this embodiment collar 52 is of the buckle-type wherein one end of the webbing is connected to buckle 54 and the opposite tapered end is formed having a plurality of openings 56 to selectively engage with the buckle when the collar is in place. Furthermore, for this embodiment, the retro-reflective threads 32 are interwoven only to the top or exposed side of the webbing.

In FIG. 5, the animal control means is represented by numeral 60 which shows a single strap of flexible webbing containing the retro-reflective threads 32 interwoven to the top or exposed side of the webbing. The control means is in the form of a harness 62 for the animal and is of the type provided with a handgripping portion 64 for use by a person who has lost his or her sight. Buckle fastening means 66 also are provided for connecting the harness to the animal in conventional manner. The harness thus acts as a safety device for the blind person as well as the guide dog by reason of the reflective characteristics of the retro-reflective threads and the improved nighttime visibility of the harness when exposed to light from oncoming traffic.

FIG. 6 is similar to that of FIG. 5 wherein the animal control means 70 is in the form of a harness 72 containing the retro-reflective threads 32 only on the top or exposed side of the webbing. However, for this embodiment, harness 72 is provided with a ring 74 for engagement with the clip of a leash in conventional manner. Buckle fastening means 76 serves to connect the harness to the animal.

The webbing used in making the animal control member can be provided in a multitude of colors. The retro-reflective threads 32 are silver in color which add to their reflective brilliance.

There is thus provided an improved safety device for an animal to render the same more visible at nighttime, thereby to minimize injury from oncoming traffic to the animal and to the person walking the animal.

While preferred embodiments of the invention have been shown and described in detail, it will be obvious to those skilled in the art and readily understood and appreciated that numerous omissions, changes and additions may be made without departing from the scope of the invention.

I claim:

1. A safety device for an animal comprising:
   (a) animal control means adapted for association with the animal to control movement thereof, and
   (b) retro-reflective thread means incoporated directly into said animal control means for illumination thereof to render it visible at nighttime to an observer at a light source by reflecting a large portion of the light emitted from the light source directly back to said light source regardless of the angle of incidence of the emitted light onto said retro-reflective means, such that the pathway for the angle of reflection of the light is substantially the same as the pathway for the angle of incidence for returning the major portion of the light directly back to the light source.

2. The safety device as claimed in claim 1, wherein said retro-reflective threads means comprises elements which include a thread having glass reflective elements interwoven with said animal control means.

3. The safety device as claimed in claim 1, wherein said retro-reflective thread means comprises elements including a plurality of threads having glass reflective beads interwoven with said animal control means in substantially parallel paths.

4. The safety device as claimed in claim 3, wherein said plurality of retro-reflective threads extend in an undulating manner along said animal control means to reflect the light back to the light source directly, but in a non-uniform and undulating pattern, to form a substantially solid image projection.

5. The safety device as claimed in claim 2, wherein said animal control means has a top side and a bottom side, and said retro-reflective thread is interwoven to each of said sides.

6. The safety device as claimed in claim 2, wherein said animal control means is flexible webbing in the form of a leash.

7. The safety device as claimed in claim 2, wherein said animal control means is flexible webbing in the form of a collar to be worn by the animal.

8. The safety device as claimed in claim 2, wherein said animal control means is flexible webbing in the form of a combined leash and collar for the animal.

9. The safety device as claimed in claim 2, wherein said animal control means is a flexible webbing harness for the animal.

10. A safety device for an animal comprising:
  (a) animal control means adapted for association with the animal to control movement thereof, and
  (b) retro-reflective thread elements incorporated directly into said animal control means for illumination thereof to render it visible at nighttime to an observer at a light source, said elements, when illuminated by light from the light source, reflecting a substantial portion of the incident light directly back to the light source, the pathway of the reflected light being substantially the same as the pathway for the incident light.

11. A safety device for an animal, comprising:
  a flexible animal control device formed of a flexible webbing adapted for association with the animal to control movement thereof; and
  a retro-reflective thread incorporated directly with said flexible webbing so that said retro-reflective thread and said flexible webbing form a composite structure;
  said composite structure including retro-reflective elements forming part of said retro-reflective thread so that illumination of said composite structure renders it visible at night time to an observer at a light source by directly reflecting a large portion of the light emitted from the light source regardless of the angle of incidence of the emitted light onto said retro-reflective thread, such that the pathway for the angle of incidence from the light source and the angle of reflection for returning the major portion of the light directly back to the light source coincide.

12. The safety device of claim 11, wherein said retro-reflective thread is on one face of said webbing.

13. The safety device of claim 11, wherein said retro-reflective thread is on two opposite faces of said webbing.

14. The safety device of claim 11, wherein said retro-reflective thread is interwoven with said webbing.

15. The safety device of claim 11, including a plurality of said retro-reflective threads.

16. The safety device of claim 15, wherein said plurality of retro-reflective threads are interwoven with said webbing.

17. The safety device of claim 15, wherein said plurality of retro-reflective threads is on one face of said webbing.

18. The safety device of claim 15, wherein said plurality of retro-reflective threads is on two opposite faces of said webbing.

19. The safety device of claim 16, wherein said plurality of retro-reflective threads is interwoven with said webbing in an undulating manner and is on two opposite faces of said webbing.

20. The safety device as claimed in claim 10, wherein said animal control means includes a flexible webbing and said retro-reflective elements is a retro-reflective thread interwoven with said webbing.

* * * * *